(12) United States Patent
Hasushita et al.

(10) Patent No.: US 6,169,853 B1
(45) Date of Patent: Jan. 2, 2001

(54) ZOOMING OPTICAL SYSTEM

(75) Inventors: Sachio Hasushita; Takayuki Ito, both of Saitama-ken (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/222,916

(22) Filed: Dec. 30, 1998

(30) Foreign Application Priority Data

Jan. 5, 1998 (JP) .................................................. 10-000361

(51) Int. Cl.⁷ ............................ G03B 17/00; G02B 27/64; G02B 15/14
(52) U.S. Cl. ............................... 396/55; 396/79; 359/557; 359/689; 359/823
(58) Field of Search .............................. 396/55, 52, 79; 359/557, 554, 676, 823, 689

(56) References Cited

U.S. PATENT DOCUMENTS

| | | | |
|---|---|---|---|
| 5,519,538 | 5/1996 | Maruyama ........................ 359/557 X |
| 5,530,593 | 6/1996 | Shibayama et al. .................. 359/689 |
| 5,638,210 | * 6/1997 | Sato et al. ............................. 359/557 |
| 5,835,272 | * 11/1998 | Kodama ................................ 359/557 |

FOREIGN PATENT DOCUMENTS

| | | |
|---|---|---|
| 6-118305 | 4/1994 | (JP) . |
| 6-265827 | 9/1994 | (JP) . |

\* cited by examiner

*Primary Examiner*—W. B. Perkey
(74) *Attorney, Agent, or Firm*—Greenblum & Bernstein, P.L.C.

(57) ABSTRACT

A zooming optical system is provided with a plurality of lens groups that are moved to change a focal length of the zooming optical system. One of the plurality of lens groups including an aperture member has constituted to have (I) a focusing lens group that is driven to move for focusing, and (II) a image-vibration compensation lens group that is driven to move for compensating trembling of image due to a hand-vibration applied to the zooming optical system. The aperture member does not move when the focusing lens group or the image-vibration compensation lens group is driven to move.

20 Claims, 8 Drawing Sheets

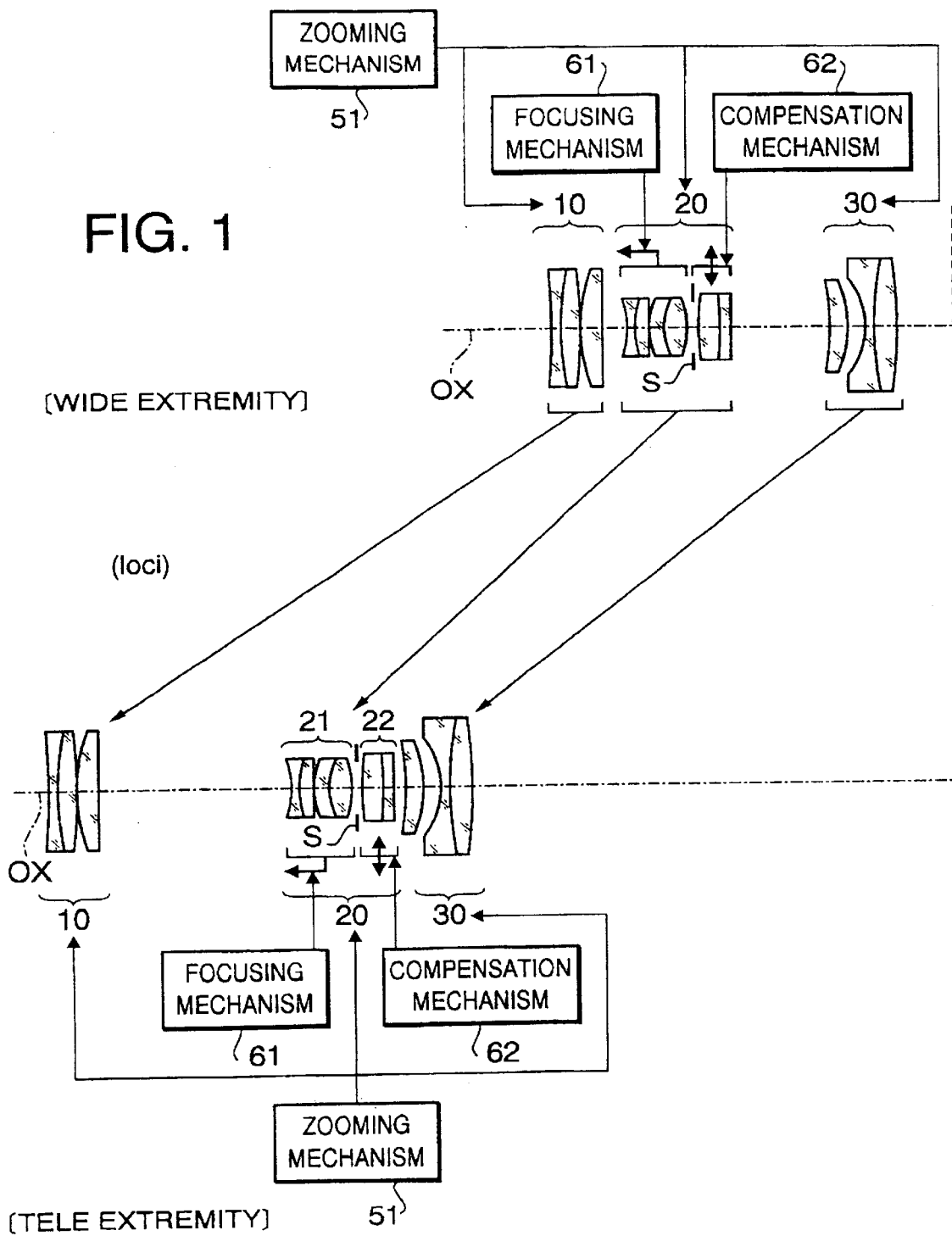

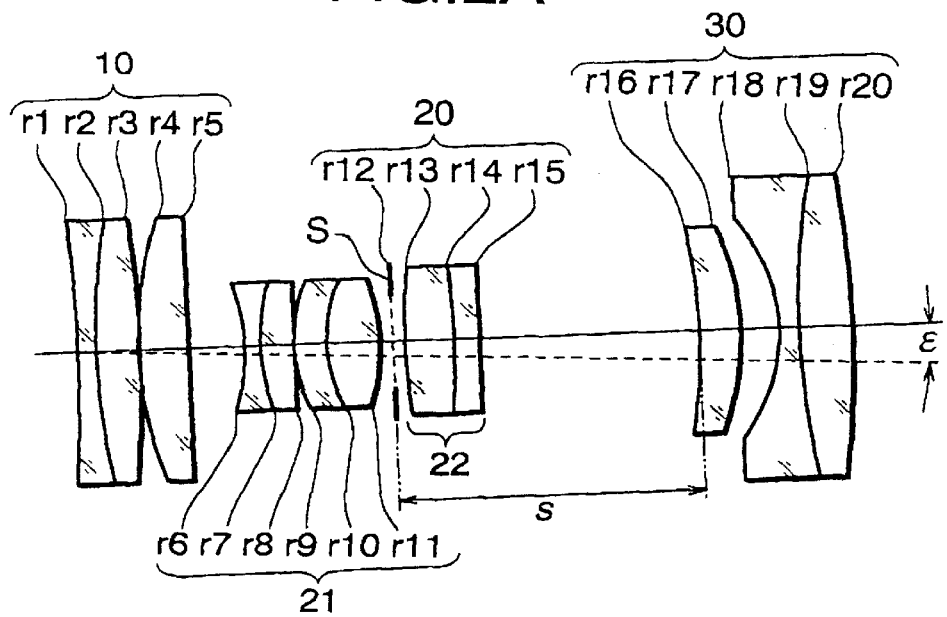
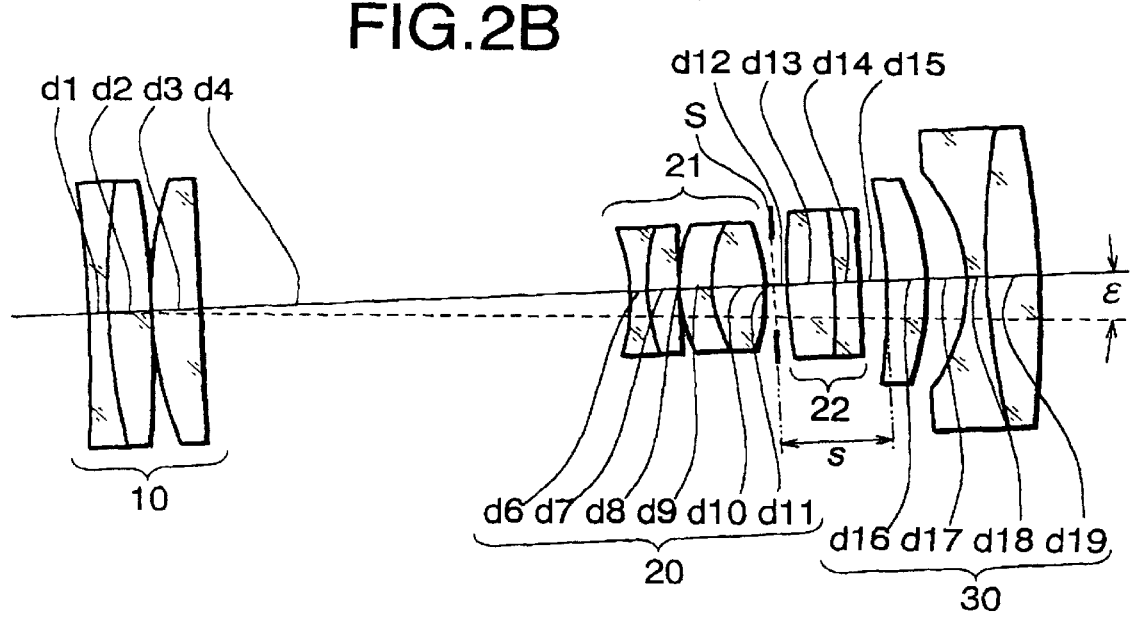

ZOOMING OPTICAL SYSTEM

BACKGROUND OF THE INVENTION

The present invention relates to a zooming optical system that has an image-vibration compensation function, and is applicable to cameras such as cameras using a photographing film, still or video cameras, and the like.

Conventionally, cameras provided with an image-vibration compensation system for compensating vibration of image due to the hand-held shake applied to the camera has been known.

An example of the image-vibration compensation system for camera is described in Japanese Patent Provisional Publication HEI 6-265827.

In the conventional image-vibration compensation system disclosed in the above publication, a compensation lens is decentered (i.e., moved in a plane which is perpendicular to the optical axis of the photographing lens) to compensate trembling of the image caused by the hand-held vibration applied to the camera. Specifically, in the publication above, a zooming optical system for a camera is disclosed, and the zooming optical system includes an image-vibration compensation lens. The image-vibration compensation lens as disclosed has, however, a relatively strong refractive power, and therefore, various types of aberrations which may affect image quality would cause when the compensation lens is decentered for compensation. In order to cancel such aberrations, further lenses should be provided. Thus, the number of lenses included in the compensation lens system increases. Due to relatively large number of lenses, the weight of the compensation lens system increases, and accordingly a quick movement of the compensation lens is prevented. Since the compensation lens has a strong power, the compensation can be done by relatively small movement, theoretically. Practically, however, the compensation lens should be driven at high accuracy. To drive a relatively heavy lens system at high accuracy is difficult, and therefore, it is difficult to obtain sufficient compensation result in such a system.

Furthermore, according to the publication, focusing is done by moving (1) a lens group closest to an image plane, (2) an entire lens group including an aperture, or (3) a lens group including the aperture and a lens group for image-vibration compensation.

In a recently employed zoom lens for a still camera or video camera, a back focus is very short when the focal length of the zoom lens is shortest. Thus, the lens group closest to the image plane is required to have a relatively large diameter. Therefore, such a lens group that is arranged on the image plane side may be too heavy to move for focusing.

Lenses arranged close to the aperture member are relatively small. However, recent zoom lenses are required to have a relatively large ratio of a variable power, and accordingly, the number of lenses included in a lens group which has the aperture member is relatively large. Therefore, such a lens group may be too heavy to move for focusing.

If the lens group which includes the image-vibration compensation lens is moved also for focusing, required is a mechanism for moving the image-vibration compensation lens either in a direction parallel to the optical axis or in a direction perpendicular to the optical axis. Such a mechanism would be very complicated.

SUMMARY OF THE INVENTION

It is therefore an object of the invention to provide a zooming optical system having an image-vibration compensation system, in which a lens group for image-vibration compensation can be moved quickly with a relatively simple structure, and does not make the zooming and focusing mechanisms complicated.

For the above object, according to the invention, there is provided a zooming optical system, which is provided with a plurality of lens groups that are moved to change a focal length of the zooming optical system. Each of these lens groups is driven to move unitarily for zooming. One of the plurality of lens groups, which includes an aperture member, has a focusing lens group that is driven to move for focusing, and an image-vibration compensation lens group that is driven to move for compensating trembling of image due to a hand-held shake applied to the zooming optical system.

Since part (i.e., the focusing lens group) of the lens group, which has the aperture member, is constituted to move for focusing, and another part (i.e., the image-vibration compensation lens group) of the lens group is constituted to move for the image-vibration compensation, each of the lenses moved for focusing and image-vibration compensation can be formed relatively light in weight, and accordingly, can be driven quickly and accurately. Further, driving mechanisms for focusing and image-vibration compensation can be simplified.

Optionally, the aperture member is arranged between the focusing lens group and the image-vibration compensation lens group.

This structure also simplifies the constitution of the driving mechanisms for focusing and image-vibration compensation.

It is preferable that another lens group is arranged on an object side of the lens group which includes the aperture member and the focusing and image-vibration compensation lens groups. With this structure, the driving mechanisms for the focusing and image-vibration compensation lens groups can be arranged at midst portion of all the lens groups included in the zooming optical system. Such an arrangement may prevent interference of the driving mechanisms with respect to the other structural members.

In particular, a decentering amount of the image-vibration compensation lens group DEC is defined by equation (1):

$$DEC \approx (f_{1a} \cdot f_{1b} \cdot \tan\epsilon)/(f_{1a} - f_{1b}) \qquad (1)$$

where,

DEC denotes an amount, in the direction perpendicular to the optical axis OX of movement of the image-vibration compensation lens group, $f_{1a}$ denotes a composite focal length of lens groups located on an object side of the image-vibration compensation lens group (the image-vibration compensation lens group excluded), $f_{1b}$ is a composite focal length of the lens groups located on the object side of the image-vibration compensation lens group and the image-vibration compensation lens group, and $\epsilon$ is an angle by which the optical axis OX is rotated with respect to a point where the optical axis OX intersects an object side surface of a lens which is closest to the object (see FIGS. 2A, 2B, 7A and 7B).

It is preferable that the zooming optical system satisfies condition (2):

$$0.15 < s_{min}/y < 0.5 \qquad (2)$$

where, $s_{min}$ denotes a minimum value of equivalent air distance s between a lens surface or an aperture plane which is located on the object side of the image-vibration compensation lens group and is closest to the image-vibration compensation lens group, and a lens surface or an aperture plane which is located on the image side of the image-vibration compensation lens group and is closest to the image-vibration compensation lens group, and y denotes the largest image height of the zooming optical system.

It is further preferable that the hand-vibration compensation lens group includes at least a pair of cemented positive and negative lenses, and condition (3) is satisfied:

$$20 < vp - vn \tag{3}$$

where, vp represents an average of Abbe numbers of positive lenses which are included in the cemented lens; and vn represents an average of Abbe numbers of negative lenses which are included in the cemented lens.

Further optionally, the image-vibration compensation lens group includes at least one aspherical surface. By forming the aspherical surface, aberrations can be compensated easily.

Furthermore, it is preferable that condition (4) is satisfied:

$$1.0 < ft/f3 < 2.0 \tag{4}$$

where, ft is a focal length of the zooming optical system when located at a TELE extremity; and
f3 is a focal length of the image-vibration compensation lens group.

Still further, it is preferable that condition (5) is satisfied:

$$0.09 < L3/y < 0.25 \tag{5}$$

where, L3 is an equivalent air distance between a surface, of the image-vibration compensation lens group, located closest to the object and a surface, of the image-vibration compensation lens group, located closest to the image.

Optionally, the zooming optical system is constructed such that the aperture member does not move when the image-vibration compensation lens group moves in a direction perpendicular to an optical axis of the zooming optical system. Optionally, or alternatively, the aperture member does not move when the focusing lens group moves for focusing.

Generally, the aperture member includes an opening/closing mechanism for changing the diameter of an aperture opening. Thus, if the aperture member is not moved when the image-vibration compensation lens group moves, a quick and accurate movement can be performed.

DESCRIPTION OF THE ACCOMPANYING DRAWINGS

FIG. 1 shows a structure of a photographing optical system for a camera embodying the invention;

FIG. 2A shows a structure and arrangements of lenses of the photographing optical system according to a first embodiment of the invention when the focal length is the greatest;

FIG. 2B shows a structure and arrangements of the lenses of the photographing optical system when the focal length is the smallest;

DETAILED DESCRIPTION OF THE EMBODIMENTS

Figure 3A:
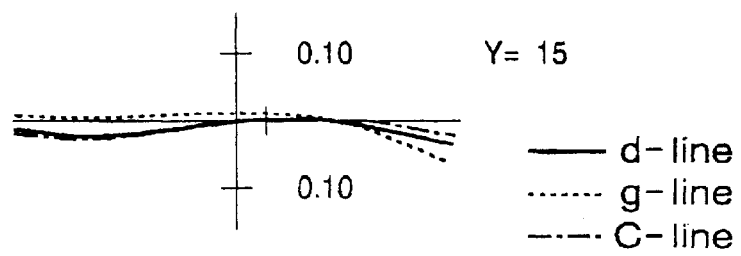
FIGS. 3A–3C show lateral aberrations of the optical system shown in FIG. 2A.

FIG. 1 schematically shows a structure of a zooming optical system according to the present invention. The zooming optical system includes first, second and third lens groups 10, 20 and 30, in this order from an object side (i.e., the left hand side in FIG. 1). The first, second and third lens groups 10, 20 and 30 are movable between two positions: WIDE extremity position and TELE extremity position. It should be noted that the term "position" refers to the location and arrangement of the lens groups, and is not intended to designate a single point.

In FIG. 1, a condition where the lens groups are located at the WIDE extremity position is shown in the upper portion thereof, and a condition where the lens groups are located at the TELE extremity position is indicated on the lower portion of FIG. 1. Between the arrangements at WIDE and TELE extremities, loci of the lens groups 10, 20 and 30 are illustrated, respectively. The lens groups 10, 20 and 30 are driven, for zooming, along an optical axis OX by a zooming mechanism 51.

The second lens group 20 includes a focusing lens group 21, an aperture member S, and an image-vibration compensation lens group 22 in this order, from the object side. It should be noted that in this specification, the term aperture member refers to an aperture member whose aperture diameter is changeable, e.g., one which functions as a shutter, or an iris diaphragm. The focusing lens group 21, the aperture member S and the image-vibration compensation lens group 22 move unitarily when zooming operation is executed.

The focusing lens group 21 is neutrally located on an infinity position (i.e., a position at which an object at infinity is focused on) regardless of the focal length of the zooming optical system. When focusing is to be performed (e.g., photographing is executed), the focusing lens group 21 is moved, along the optical axis OX, towards the object side so as to focus on the object.

The image-vibration compensation lens group 22 are neutrally arranged such that the optical axis thereof coincides with the optical axis OX of the entire zooming optical system regardless of the focal length of the zooming optical system. When the image-vibration compensation is to be performed, the image-vibration compensation lens group 22 is moved in a direction perpendicular to the optical axis OX.

As indicated in FIG. 1, the focusing lens group 21 is moved, for focusing, by a focusing mechanism 61, and the image-vibration compensation lens group 22 is moved, for compensating trembling of the image due to a hand-held shake, by a compensation mechanism 62. Amount and direction of the movement of the image-vibration compensation lens group 22 is determined based on a hand-held shake applied to the zooming optical system.

Figure 12:
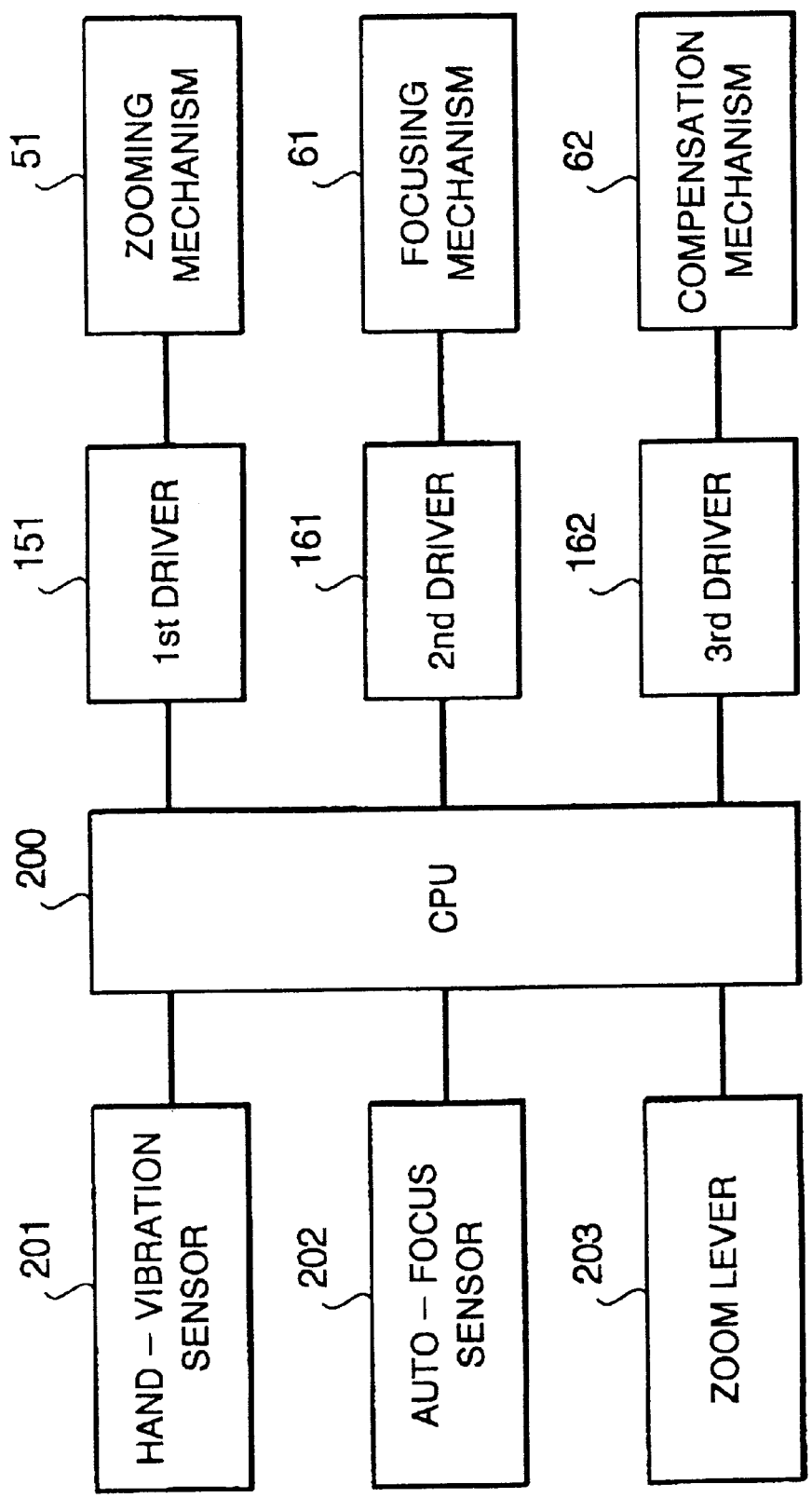
FIG. 12 is a block diagram illustrating a control system for driving the lens groups of the zooming optical system.

FIG. 12 is a block diagram illustrating a control system for controlling movement of lens groups.

The control system includes a hand-vibration sensor 201 which detects hand-held shake applied to the camera. Specifically, the hand-vibration sensor 201 includes a pair of angular velocity sensors for respectively detecting the angular velocities in directions perpendicular to each other, with respect to a point at which the outermost surface of the zooming optical system and the optical axis OX intersect. Further, the control system includes an AF (Automatic Focusing) sensor which detects an object distance. The hand-vibration sensor 201 and the AF sensor 202 are connected to a CPU (Central Processing Unit) 200. A zoom lever 203 is also connected to the CPU 200.

The zooming mechanism 51 is connected to the CPU 200 via a first driver 151, the focusing mechanism 61 is connected to the CPU 200 via a second driver 161, and the compensation mechanism 62 is connected to the CPU 200 via a third driver 162.

The CPU 200 controls the first driver 151 based on operation of the zoom lever 202 to drive the zooming mechanism 51. The CPU 200 controls the second driver 161 to drive the focusing mechanism based on the object distance detected by the AF sensor 202. Further, based on the hand-vibration detected by the hand-vibration sensor 201, the CPU 200 calculates an amount of movement of the image-vibration compensation lens group 22, and controls the third driver 162 to drive the compensation mechanism 62.

The present invention is directed to the optical system including a hand-vibration sensor, AF sensor, moving mechanisms for moving the lens groups. However, details thereof do not form part of the invention. The control system shown in FIG. 12 is, therefore, provided to assist in understanding of the invention, and any types of suitable hand-vibration sensor, AF sensor, and moving mechanisms could be employed.

In the zooming optical system constructed as explained above, the image-vibration compensation lens group 22 is driven in accordance with equation (1) below:

$$DEC \approx (f_{1a} \cdot f_{1b} \cdot \tan\epsilon)/(f_{1a} - f_{1b}) \quad (1)$$

where,

DEC denotes an amount, in the direction perpendicular to the optical axis OX of movement of the image-vibration compensation lens group 22, $f_{1a}$ denotes a composite focal length of lens groups located on an object side of the image-vibration compensation lens group(the image-vibration compensation lens group excluded), $f_{1b}$ is a composite focal length of the lens groups located on the object side of the image-vibration compensation lens group and the image-vibration compensation lens group 22, and $\epsilon$ is a tilt angle by which the optical axis OX is rotated, due to the hand-held shake, about a point where the optical axis OX intersects an object side surface of a lens which is arranged closest to the object (see FIGS. 2A, 2B, 7A or 7B).

Equation (1) defines a relationship between the amount DEC and the tilt angle $\epsilon$. By moving the image-vibration compensation lens group 22 by amount DEC, the image can be stabilized. Experiments show that the tilt angle is approximately 0.3 degrees.

It is preferable that DEC when $\epsilon$ is equal to 0.3 degrees satisfies the condition below in view of the accuracy of the driving mechanism, and a space for accommodating the driving mechanism:

$$0.8 < DEC < 1.5$$

If DEC is lower than the lower limit (i.e., 0.8), moving amount of the image when the lens group 22 is moved is too large with respect to the movement of the compensation lens group 22, and thus movement of the compensation lens group 22 cannot be controlled accurately for compensation. If DEC exceeds the upper limit (i.e., 1.5), the diameter of the compensation lens group and the driving mechanism therefor become larger, which increases the size of the camera.

It is preferable that the zooming optical system satisfies condition (2) below.

$$0.15 < s_{min}/y < 0.5 \quad (2)$$

where, $s_{min}$ denotes a minimum value of an equivalent air distance s between a lens surface or an aperture plane which is located on the object side of the image-vibration compensation lens group and is arranged closest to the image-vibration compensation lens group, and a lens surface or an aperture plane which is located on the image side of the image-vibration compensation lens group and is arranged closest to the image-vibration compensation lens group (see FIGS. 2A, 2B, 7A and 7B), and y denotes the largest image height of the zooming optical system.

Condition (2) relate to the size of the zooming optical system. If $s_{min}/y$ is lower than the lower limit, s is too small and it is difficult to employ a driving mechanism of the image-vibration compensation lens group. If $s_{min}/y$ exceeds the upper limit of condition (2), the photographing lens is too large in a direction of the diameter as well as in a direction of the optical axis OX, and accordingly the zooming optical system cannot be made portable.

It is preferable that the image-vibration compensation lens group has at least two lenses. Further preferably, the two lenses are positive and negative lenses so that chromatic aberration of the image-vibration compensation lens can be compensated thereby. The positive lens and the negative lens could constitute a cemented lens. If the positive lens and the negative lens constitute a cemented lens, optical performance may be made stable even when the positive and negative lenses are decentered with respect to each other. If at least one surface of the image-vibration compensation lens group is formed as an aspherical surface, the lens group has less aberrations even when moved for stabilized.

Further, it is preferable that the zooming optical system satisfies condition (3) below.

$$20 < vp - vn \quad (3)$$

where, vp represents an average of Abbe numbers of positive lenses which are included in the cemented lens; and vn represents an average of Abbe numbers of negative lenses which are included in the cemented lens.

Condition (3) defines a condition when a cemented lens consisting of at least one positive lens and at least one negative lens is included in the image-vibration compensation lens group 22. If condition (3) is satisfied, chromatic aberration of the image-vibration compensation lens group 22 can be well compensated. This enables compensation of longitudinal chromatic aberration and lateral chromatic aberration of the zooming optical system for all the zooming range. Further, the chromatic aberration of the image-vibration compensation lens group when moved in the direction perpendicular to the optical axis OX can be sufficiently suppressed. If condition (3) is not satisfied, it becomes difficult to compensate both the longitudinal chromatic aberration and the lateral chromatic aberration in a balanced manner.

It is further preferable that the zooming optical system satisfies condition (4) below.

$$1.0 < ft/f3 < 2.0 \qquad (4)$$

where, ft is a focal length of the zooming optical system when it is located at the TELE extremity; and f3 is a focal length of the image-vibration compensation lens group 22 when the zooming optical system is located at the TELE extremity.

Condition (4) defines the power of the image-vibration compensation lens group 22. If ft/f3 is less than the lower limit, the amount of movement of the image-vibration compensation lens group should be made relatively large. Thus, it is difficult to sufficiently drive the driving mechanism for moving the image-vibration compensation lens 22 to stabilize the image. If ft/f3 exceeds the upper limit, the moving amount for compensation can be made small. However, aberrations when the image-vibration compensation lens group is decentered may be significant, and for compensating the aberration, further lenses should be included in the image-vibration compensation lens group, which increase the weight thereof. It would be relatively difficult to control accurate movement of such a heavy lens group.

Still further, it is preferable that condition (5) is also satisfied.

$$0.09 < L3/y < 0.25 \qquad (5)$$

is where, L3 is an equivalent air distance between a surface, of the image-vibration compensation lens group, arranged closest to the object and a surface, of the image-vibration compensation lens group, arranged closest to the image.

If L3/y is smaller than the lower limit (i.e., 0.09), the image-vibration compensation lens group 22 cannot be constituted. If L3/y is greater than the upper limit (i.e., 0.25), the image-vibration compensation lens group becomes larger, which increase the weight of the lens group, and thus, the accurate control of the image-vibration compensation system is made relatively difficult.

The aperture member is provided with an opening/closing mechanism which increases the weight of the lens group including the aperture member. In particular, in recent compact zoom cameras, the aperture is used also as a shutter. Thus, the aperture member is relatively heavy, and accordingly it is preferable that the aperture member stays unmoved when the focusing lens group is moved along the optical axis OX and/or when the image-vibration compensation lens group is moved in the direction perpendicular to the optical axis OX. In another aspect, for preventing unnecessary light to proceed within the optical system, it is also preferable that the aperture member is unmoved even when the focusing lens group and/or the image-vibration compensation lens group is moved.

[Numerical Embodiments]

Hereafter, numerical embodiments of the telescopic optical systems will be described with reference to drawings and tables.

In the drawings and tables, Fno denotes an F-number, f (mm) denotes a focal length, 2ω denotes a double viewing angle, $f_B$ (mm) denotes a back focus, r (mm) denotes a radius of curvature of a surface (the values at the vertex for aspherical surfaces), d (mm) denotes a distance between the surfaces along the optical axis, Nd denotes a refractive index at a wavelength of 587.6 nm (d-line), and vd denotes the Abbe number. In the tables, when the distance D is variable, a distance Dw when the zooming optical system is positioned at a wide extremity and a distance Dt when the zooming optical system is positioned at a TELE extremity are indicated in this order as Dw–Dt.

An aspherical surface is expressed by the following equation:

$$X(h) = \frac{Ch^2}{1 + \sqrt{1 - (1+K)h^2 C^2}} + A_4 h^4 + A_6 h^6 + A_8 h^8 + A_{10} h^{10} \ldots$$

where, X(h) is a SAG, that is, a distance, from a tangential plane, of a point on the aspherical surface where the height from the optical axis is h. C is a curvature (1/r) of the vertex of the surface, K is a conic constant, $A_4, A_6, A_8$ and $A_{10}$ are aspherical surface coefficients of fourth, sixth, eighth and tenth orders.

[First Embodiment]

FIGS. 2A and 2B show a structure of a zooming optical system according to a first embodiment of the invention: FIG. 2A shows an arrangement when the zooming optical system is positioned at the WIDE extremity; and FIG. 2B shows an arrangement when the zooming optical system is positioned at the TELE extremity.

The zooming optical system includes, from an object side (i.e., from the left-hand side of the drawing), a first lens group 10 (i.e., surface numbers #1–#5) having a positive power, a second lens group 20 (i.e., surface numbers #6–#15) which includes an aperture S, and a third lens group 30 (i.e., surface numbers #16–#20). The second lens group 20 has a focusing lens group 21 located on the object side of the aperture S, and an image-vibration compensation lens group 22 located on the rear side (i.e., the right-hand side of the drawing). Both the focusing lens group 21 and the image-vibration compensation lens group 22 have positive power. The numerical construction of the first embodiment is indicated in TABLE 1.

TABLE 1

|  | WIDE | TELE |
|---|---|---|
| f= | 49.50 | 192.56 |
| Fno= | 5.5 | 14.0 |
| fB= | 9.60 | 83.83 |
| 2ω= | 45.64 | 12.65 |

| Surface Number | r | dw | dt | Nd | vd |
|---|---|---|---|---|---|
| #1 | −125.58 | 1.50 |  | 1.83400 | 37.2 |
| #2 | 65.23 | 3.30 |  | 1.55402 | 47.8 |
| #3 | −77.65 | 0.10 |  |  |  |
| #4 | 36.20 | 3.75 |  | 1.48749 | 70.2 |
| #5 | −1112.59 | 4.32 | −33.11 |  |  |
| #6 | −16.03 | 1.30 |  | 1.83481 | 42.7 |
| #7 | 16.03 | 2.56 |  | 1.84666 | 23.8 |
| #8 | −214.91 | 0.10 |  |  |  |
| #9 | 22.20 | 2.36 |  | 1.84666 | 23.8 |
| #10 | 12.54 | 3.91 |  | 1.58913 | 61.2 |
| #11* | −16.12 | 1.00 |  |  |  |
| #12 | infinity | 1.00 |  |  |  |

TABLE 1-continued

| | | | | | |
|---|---|---|---|---|---|
| #13 | 127.85 | 3.50 | | 1.77250 | 49.6 |
| #14 | −60.36 | 2.00 | | 1.80421 | 25.1 |
| #15* | −361.29 | 17.18 | −2.10 | | |
| #16* | −32.51 | 3.00 | | 1.58547 | 29.8 |
| #17* | −21.15 | 3.21 | | | |
| #18 | −13.19 | 1.50 | | 1.83481 | 42.7 |
| #19 | 66.90 | 3.93 | | 1.84666 | 23.8 |
| #20 | −80.58 | | | | |

*denotes aspherical surfaces

The conic constant K, and aspherical surface coefficients $A_4$, $A_6$, $A_8$ are indicated in TABLE 2. $A_{10}$ is equal to zero in this embodiment.

TABLE 2

| Surface Number | K | A4 | A6 | A8 |
|---|---|---|---|---|
| #11 | 0.0 | $3.621 \times 10^{-5}$ | $1.322 \times 10^{-8}$ | 0.0 |
| #15 | 0.0 | $7.403 \times 10^{-7}$ | $-9.786 \times 10^{-9}$ | 0.0 |
| #16 | 0.0 | $8.521 \times 10^{-5}$ | $1.346 \times 10^{-7}$ | $8.701 \times 10^{-10}$ |
| #17 | 0.0 | $4.174 \times 10^{-5}$ | $1.670 \times 10^{-7}$ | 0.0 |

When the zooming optical system is driven from the WIDE extremity to the TELE extremity, the distance between the first lens group 10 and the second lens group 20 increases, and the distance between the second lens group 20 and the third lens group 30 decreases. The focusing lens group 21 included in the second lens group 20 moves with respect to the image-vibration compensation lens group 22 when the focusing is performed, and the image-vibration compensation lens group 22 moves with respect to the focusing lens group 21 when the image-vibration compensation is performed. The aperture member S stays unmoved either when the focusing lens group 21 moves or when the image-vibration compensation lens group 22 moves.

The first lens group 10 is a two-group three-element lens, which includes, from the object side, cemented positive and negative lens, and a positive lens. The focusing lens group 21 is a two-group four-element lens, each group of which includes cemented negative and positive lenses. The image-vibration compensation lens group 22 is a pair of cemented positive and negative lenses. The third lens group 30 is a two-group three-element lens which includes a negative lens, and cemented negative and positive lenses.

Figure 3B:
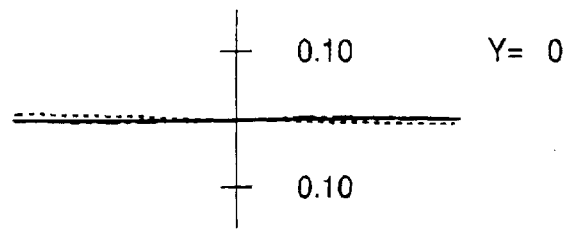
Figure 3C:
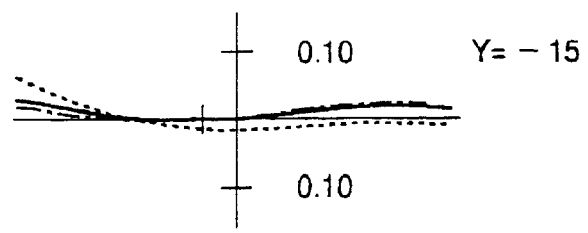
Figure 4A:
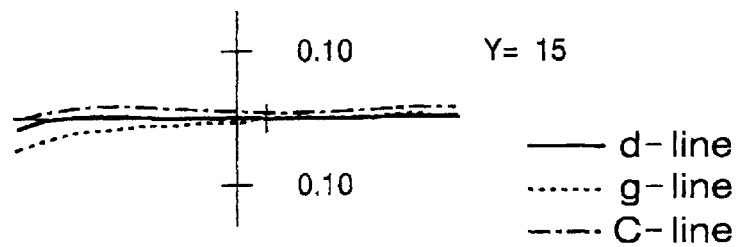
FIGS. 4A–4C show lateral aberrations of the optical system shown in FIG. 2B.
Figure 4B:
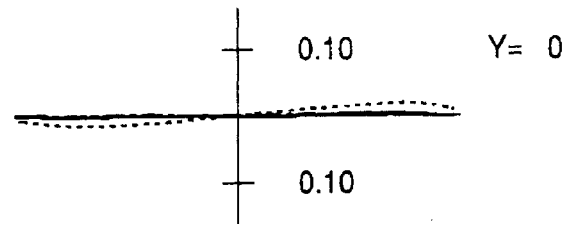
Figure 4C:
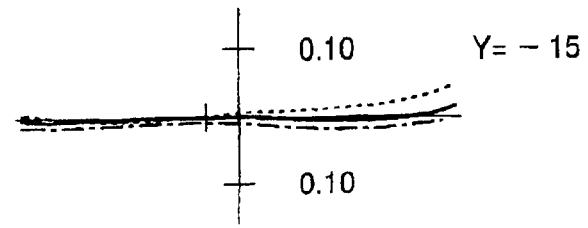

FIGS. 3A–3C show the longitudinal chromatic aberrations when the zooming optical system is positioned at the WIDE extremity. In each graph, solid line, broken line and dotted chain line represent aberrations at d-line (587.56 nm), g-line (435.83 nm) and C-line (656.27 nm). In FIGS. 4A–4C show the longitudinal chromatic aberrations when the zooming optical system is positioned at the TELE extremity.

Figure 5A:
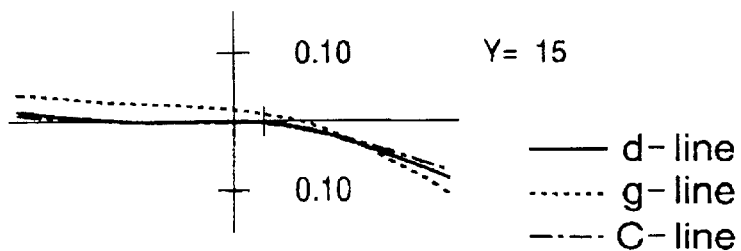
FIGS. 5A–5C show lateral aberration of the optical system shown in FIG. 2A when a tilt angle is 0.3 degrees.
Figure 5B:
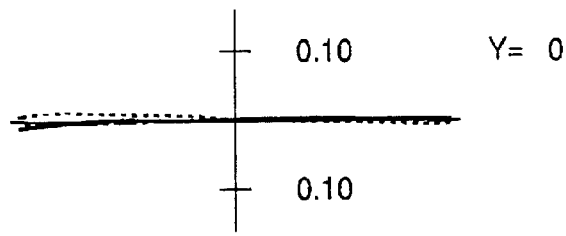
Figure 5C:
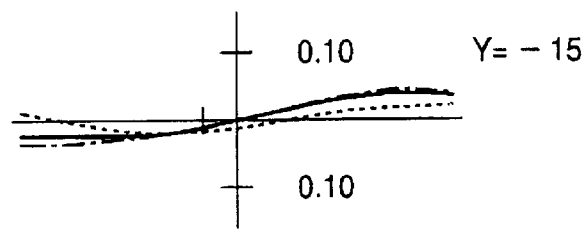
Figure 6A:
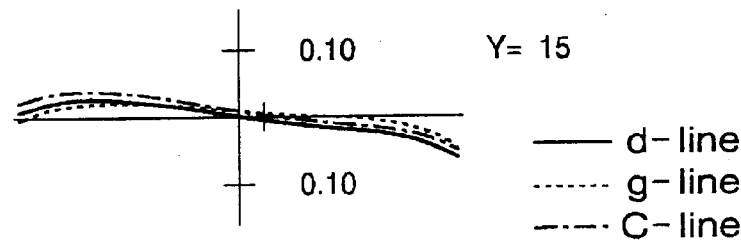
FIGS. 6A–6C show lateral aberration of the optical system shown in FIG. 2B when a tilt angle is 0.3 degrees.
Figure 6B:
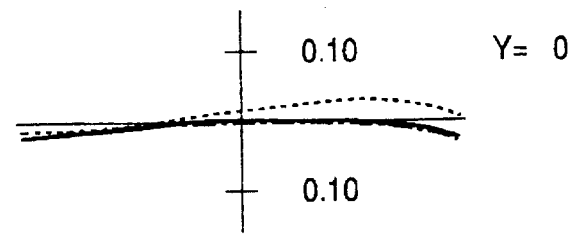
Figure 6C:
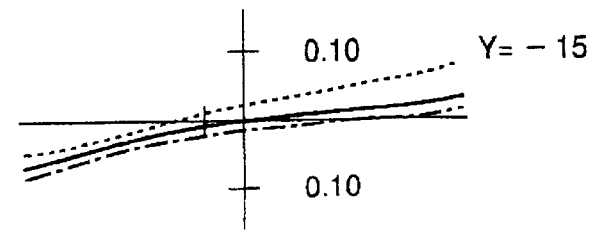

FIGS. 5A–5C show the longitudinal chromatic aberrations when the zooming optical system is positioned at the WIDE extremity, and the image-vibration compensation lens group 22 has been moved, based on equation (1), for compensating the tilt angle ε=0.3°. FIGS. 6A–6C show the longitudinal chromatic aberrations when the zooming optical system is positioned at the TELE extremity, and the image-vibration compensation lens group 22 has been moved, based on equation (1), for compensating the tilt angle ε=0.3°.

The focal lengths f1a, f1b, and DEC (mm) when ε=0.3° are indicated in TABLE 3.

TABLE 3

| | WIDE | TELE |
|---|---|---|
| f1a | 42.79 | 54.08 |
| f1b | 32.10 | 42.43 |
| DEC | 0.67 | 1.03 |

The distance s is smallest when the zooming optical system is positioned at the TELE extremity, and at that time, y=21.64. Therefore, $s_{min}/y=0.29$ L3/y=0.14, vp−vn=24.5, and ft/f3=1.48

As above, the numerical construction according to the first embodiment satisfies conditions (2)–(5).

[Second Embodiment]

Figure 7A:
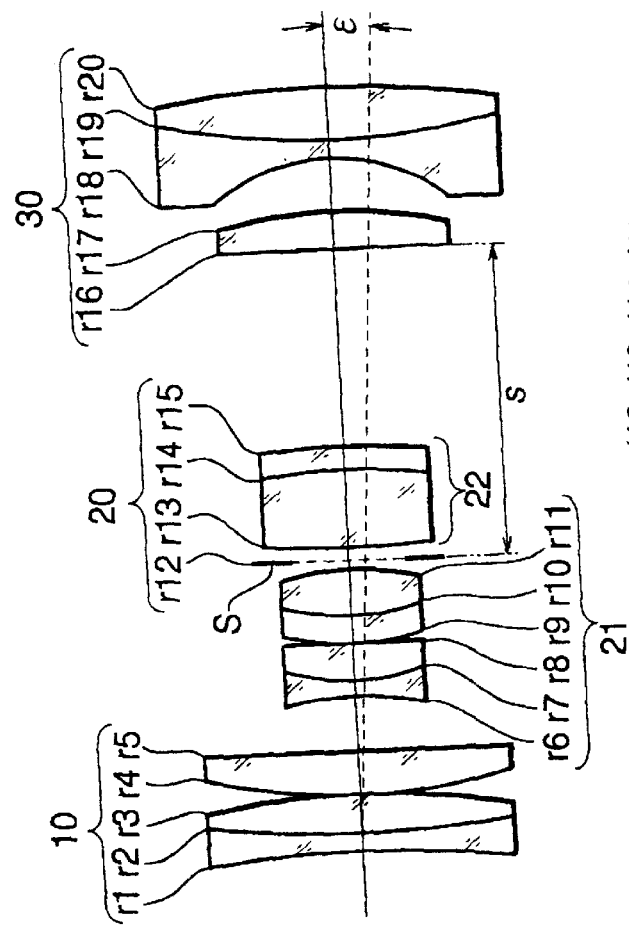
FIG. 7A shows a structure and arrangements of lenses of the photographing optical system according to a second embodiment of the invention when the focal length is the greatest.
Figure 7B:
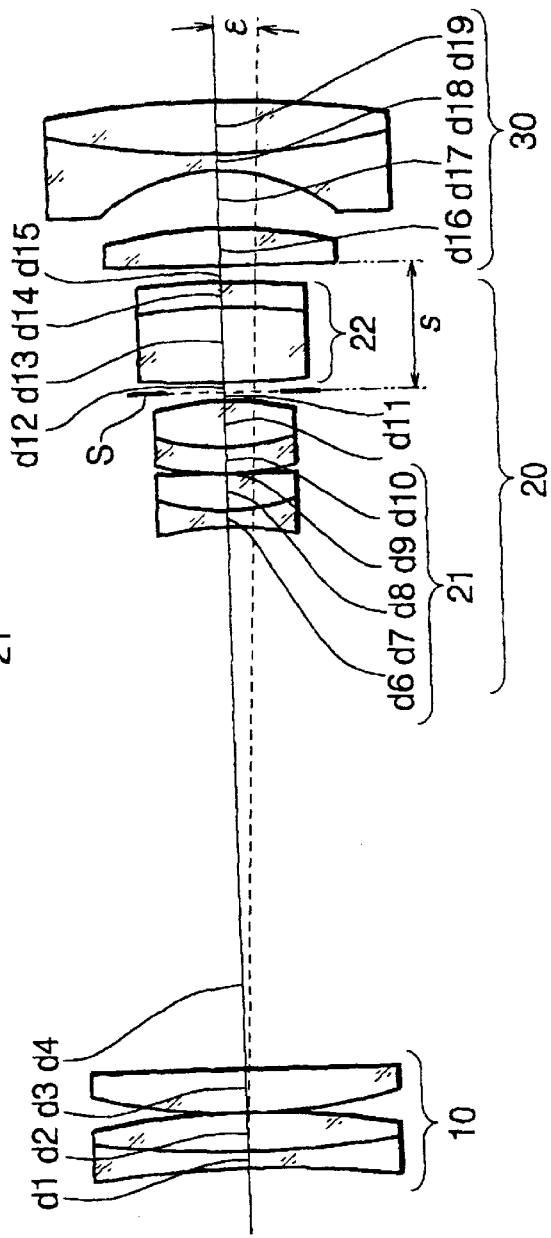
FIG. 7B shows a structure and arrangements of the lenses of the photographing optical system according to the second embodiment when the focal length is the smallest.

FIGS. 7A and 7B show a structure of a zooming optical system according to a second embodiment of the invention: FIG. 7A shows an arrangement when the zooming optical system is positioned at the WIDE extremity; and FIG. 7B shows an arrangement when the zooming optical system is positioned at the TELE extremity.

Similar to the first embodiment, the zooming optical system includes, from an object side (i.e., from the left-hand side of the drawing), a first lens group 10 (i.e., surface numbers #1–#5) having a positive power, a second lens group 20 (i.e., surface numbers #6–#15) which includes an aperture S, and a third lens group 30 (i.e., surface numbers #16–#20). The second lens group 20 has a focusing lens group 21 located on the object side of the aperture S, and a image-vibration compensation lens group 22 located on the rear side (i.e., the right-hand side of the drawing). Both the focusing lens group 21 and the image-vibration compensation lens group 22 have positive power. The numerical construction of the first embodiment is indicated in

TABLE 4

| | WIDE | TELE |
|---|---|---|
| f= | 49.50 | 192.49 |
| Fno= | 5.7 | 14.0 |
| fB= | 8.50 | 74.29 |
| 2ω= | 45.64 | 12.62 |

| Surface Number | r | dw | dt | Nd | vd |
|---|---|---|---|---|---|
| #1 | −89.34 | 1.50 | | 1.83400 | 37.2 |
| #2 | 76.14 | 3.30 | | 1.54814 | 45.8 |
| #3 | −56.36 | 0.10 | | | |
| #4 | 46.36 | 3.75 | | 1.48749 | 70.2 |
| #5 | −1112.59 | 4.57 | −46.53 | | |
| #6 | −16.15 | 1.30 | | 1.83481 | 42.7 |
| #7 | 16.15 | 3.28 | | 1.84666 | 23.8 |
| #8 | −126.94 | 0.10 | | | |
| #9 | 24.16 | 2.09 | | 1.84666 | 23.8 |
| #10 | 13.19 | 3.86 | | 1.58913 | 61.2 |
| #11* | −16.95 | 1.00 | | | |
| #12 | infinity | 1.00 | | | |
| #13 | 93.80 | 6.49 | | 1.51633 | 64.1 |
| #14 | −41.16 | 2.00 | | 1.84666 | 23.8 |
| #15 | −82.56 | 17.40 | −1.65 | | |
| #16* | −60.45 | 3.00 | | 1.58547 | 57.3 |
| #17* | −31.70 | 4.71 | | | |
| #18 | −13.39 | 1.50 | | 1.83481 | 42.7 |

TABLE 4-continued

| #19 | 64.06  | 3.93 | 1.84666 | 23.8 |
|-----|--------|------|---------|------|
| #20 | −78.43 |      |         |      |

*denotes aspherical surfaces

The conic constant K, and aspherical surface coefficients $A_4$, $A_6$ are indicated in TABLE 5. $A_8$ and $A_{10}$ are equal to zero in this embodiment.

TABLE 5

| Surface Number | K | A4 | A6 |
|---|---|---|---|
| #11 | 0.0 | $0.2720 \times 10^{-4}$ | $0.1770 \times 10^{-7}$ |
| #16 | 0.0 | $0.5459 \times 10^{-4}$ | $0.4120 \times 10^{-6}$ |
| #17 | 0.0 | $0.1662 \times 10^{-4}$ | $0.3516 \times 10^{-6}$ |

Figure 8A:
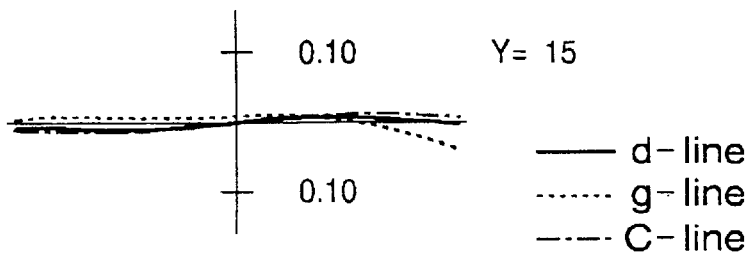
FIGS. 8A–8C show lateral aberrations of the optical system shown in FIG. 7A.
Figure 8B:
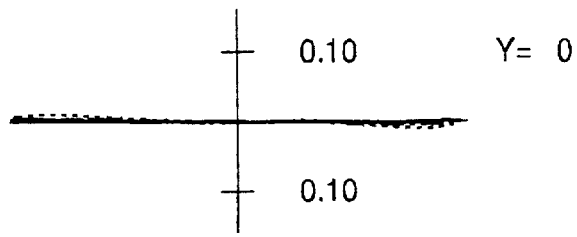
Figure 8C:
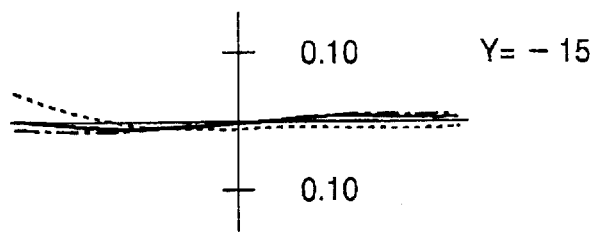
Figure 9A:
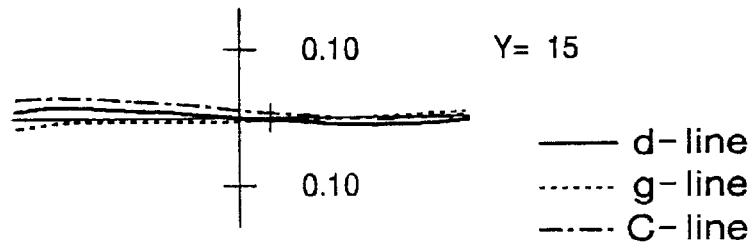
FIGS. 9A–9C show lateral aberrations of the optical system shown in FIG. 7B.
Figure 9B:
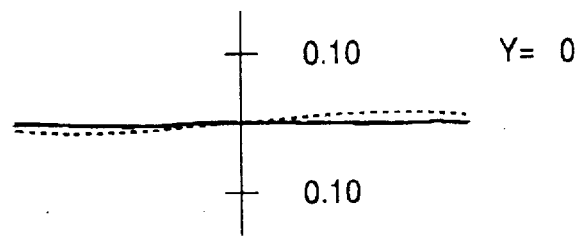
Figure 9C:
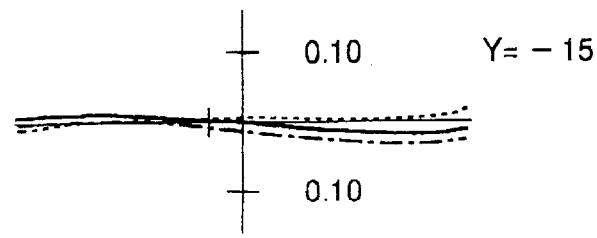

FIGS. 8A–8C show the longitudinal chromatic aberrations when the zooming optical system is positioned at the WIDE extremity. FIGS. 9A–9C show the longitudinal chromatic aberrations when the zooming optical system is positioned at the TELE extremity.

Figure 10A:
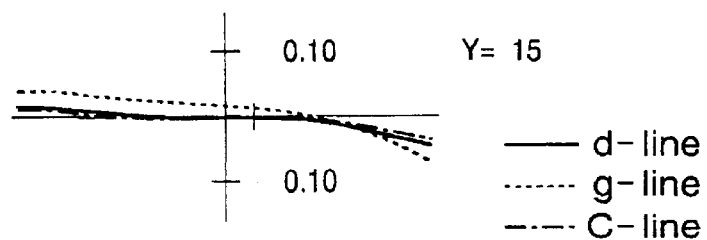
FIGS. 10A–10C show lateral aberration of the optical system shown in FIG. 7A when a tilt angle is 0.3 degrees.
Figure 10B:
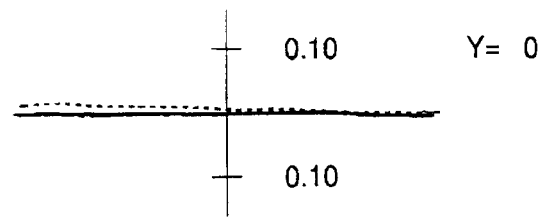
Figure 10C:
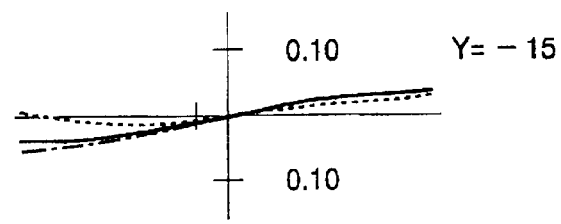
Figure 11A:
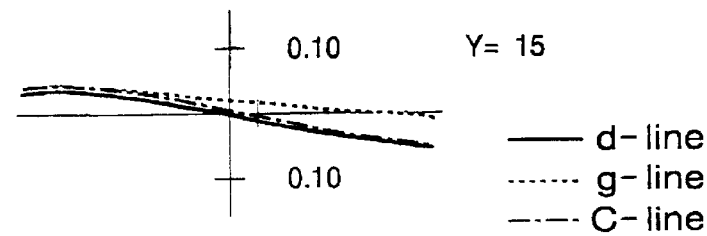
FIGS. 11A–11C show lateral aberration of the optical system shown in FIG. 7B when a tilt angle is 0.3 degrees.
Figure 11B:
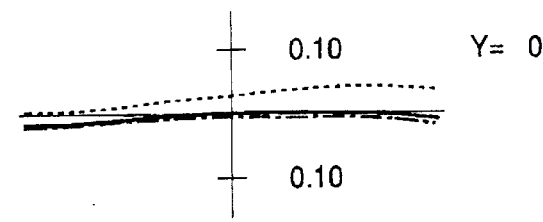
Figure 11C:
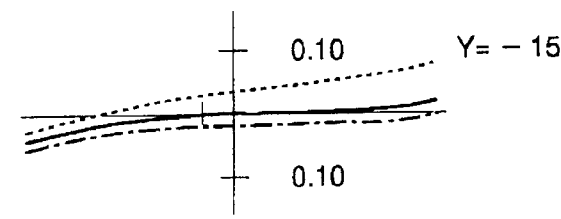

FIGS. 10A–10C show the longitudinal chromatic aberrations when the zooming optical system is positioned at the WIDE extremity, and the image-vibration compensation lens group 22 has been moved, based on equation (1), for compensating the image-vibration when the tilt angle $\epsilon=0.3°$. FIGS. 11A–11C show the longitudinal chromatic aberrations when the zooming optical system is positioned at the TELE extremity, and the image-vibration compensation lens group 22 has been moved, based on equation (1), for compensating the image-vibration when the tilt angle $\epsilon=0.3°$.

The focal lengths f1a, f1b, and DEC (mm) when $\epsilon=0.3°$ are indicated in TABLE 6.

TABLE 6

|     | WIDE  | TELE  |
|-----|-------|-------|
| f1a | 46.15 | 61.76 |
| f1b | 33.86 | 47.51 |
| DEC | 0.67  | 1.08  |

The distance s is smallest when the zooming optical system is positioned at the TELE extremity, and at that time, y=21.64.
Therefore, $s_{min}/y=0.37$
L3/y=0.25,
vp−vn=40.3, and
ft/f3=1.48

As above, the numerical construction according to the second embodiment satisfies conditions (2)–(5).

In TABLE 7 below, values of the embodiments regarding equation/conditions are indicated.

TABLE 7

| Condition | first embodiment | second embodiment |
|---|---|---|
| (1) | 0.67 (WIDE) −1.03 (TELE) | 0.67 (WIDE) −1.08 (TELE) |
| (2) | 0.29 | 0.37 |
| (3) | 24.5 | 40.3 |
| (4) | 1.48 | 1.48 |
| (5) | 0.14 | 0.25 |

As described above, according to the present invention, the image-vibration compensation lens group can be moved quickly and with relatively small power. Thus, compensation can be made accurately, and will not complicate the structure of the zooming and/or focusing mechanism.

The present disclosure relates to the subject matter contained in Japanese Patent Application No. HEI 10-000361, filed on Jan. 5, 1998, which is expressly incorporated herein by reference in its entirety.

What is claimed is:

1. A zooming optical system, comprising:
   a plurality of lens groups that are moved to change a focal length of said zooming optical system, one of said plurality of lens groups including an aperture member, said one of said plurality of lens groups including a focusing lens group that is driven to move for focusing and an image-vibration compensation lens group that is distinct from the focusing lens group and that is driven to move for compensating trembling of an image due to a vibrational movement applied to said zooming optical system.

2. The zooming optical system according to claim 1, wherein said aperture member is arranged between said focusing lens group and said image-vibration compensation lens group.

3. The zooming optical system according to claim 1, wherein another lens group is arranged on an object side of said one of said plurality of lens groups.

4. The zooming optical system according to claim 3, wherein decentering amount of said image-vibration compensation lens group DEC is defined by equation (1):

$$DEC \approx (f_{1a} \cdot f_{1b} \cdot \tan\epsilon)/(f_{1a}-f_{1b}) \quad (1)$$

where,
   DEC denotes an amount, in the direction perpendicular to the optical axis OX of movement of the image-vibration compensation lens group,
   $f_{1a}$ a denotes a composite focal length of lens groups located on an object side of the image-vibration compensation lens group (the image-vibration compensation lens group excluded),
   $f_{1b}$ is a composite focal length of the lens groups located on the object side of the image-vibration compensation lens group and the image-vibration compensation lens group, and
   $\epsilon$ is an angle by which the optical axis OX is rotated with respect to a point where the optical axis OX intersects an object side surface of a lens which is closest to the object.

5. The zooming optical system according to claim 3, wherein condition (2) is satisfied:

$$0.15 < s_{min}/y < 0.5 \quad (2)$$

where, $s_{min}$ denotes a minimum value of equivalent air distance between a lens surface or an aperture plane which is located on the object side of said image-vibration compensation lens group and is closest to said image-vibration compensation lens group, and a lens surface or an aperture plane which is located on the image side of said image-vibration compensation lens group and is closest to said image-vibration compensation lens group, and y denotes the largest image height of the zooming optical system.

6. The zooming optical system according to claim 1, wherein said image-vibration compensation lens group includes at least two lenses.

7. The zooming optical system according to claim 6, wherein said image-vibration compensation lens group includes at least one positive lens and one negative lens.

8. The zooming optical system according to claim 6, wherein said image-vibration compensation lens group includes at least a pair of cemented positive and negative lenses, and wherein condition (3) is satisfied:

$$20 < \nu p - \nu n \qquad (3)$$

where, $\nu p$ represents an average of Abbe numbers of positive lenses which are included in the cemented lens; and $\nu n$ represents an average of Abbe numbers of negative lenses which are included in the cemented lens.

9. The zooming optical system according to claim 1, wherein said image-vibration compensation lens group includes at least one aspherical surface.

10. The zooming optical system according to claim 1, wherein condition (4) is satisfied:

$$1.0 < ft/f3 < 2.0 \qquad (4)$$

where, ft is a focal length of the zooming optical system when it is located at a TELE extremity; and f3 is a focal length of said image-vibration compensation lens group.

11. The zooming optical system according to claim 1, wherein the following relationship is satisfied:

$$0.09 < L3/y < 0.25$$

where,

L3 is an equivalent air distance between a surface, of said image-vibration compensation lens group, located closest to the object and a surface, of said image-vibration compensation lens group, located closed to the image and y represents a largest image height of the zooming optical system.

12. The zooming optical system according to claim 1, wherein said aperture member does not move when said image-vibration compensation lens group moves in a direction perpendicular to an optical axis of said zooming optical system.

13. The zooming optical system according to claim 1, wherein said aperture member does not move when said focusing lens group moves for focusing.

14. The zooming optical system according to claim 1, said focusing lens group and said image-vibration compensation lens group moving integrally for zooming.

15. A zooming optical system, comprising:

a plurality of lens groups that are movable to change a focal length of said zooming optical system, one of said plurality of lens groups including an aperture member, said one of said plurality of lens groups including a focusing lens group that moves for focusing and an image-vibration compensation lens group that moves for compensating trembling of an image due to a vibratory movement applied to said zooming optical system;

wherein the zooming optical system satisfies the following relationship:

$$1.0 < ft/f3 < 2.0$$

where, ft is a focal length of the zooming optical system when the zooming optical system is located at a TELE extremity; and f3 is a focal length of said image-vibration compensation lens group.

16. The zooming optical system according to claim 15, wherein said aperture member is positioned between said focusing lens group and said image-vibration compensation lens group.

17. The zooming optical system according to claim 15, wherein another lens group is positioned on an object side of said one of said plurality of lens groups.

18. A zooming optical system, comprising:

a plurality of lens groups that are movable to change a focal length of said zooming optical system, one of said plurality of lens groups including an aperture member, said one of said plurality of lens groups including a focusing lens group that is driven to move for focusing and an image-vibration compensation lens group that is driven to move for compensating trembling of an image due to a vibratory movement applied to said zooming optical system;

wherein the zooming optical system satisfies the following relationship:

$$0.09 < L3/y < 0.25$$

where,

L3 is an equivalent air distance between a surface of said image-vibration compensation lens group, located closest to the object and a surface of said image-vibration compensation lens group, located closest to the image; and y represents a largest image height of the zooming optical system.

19. The zooming optical system according to claim 18, wherein said aperture member is arranged between said focusing lens group and said image-vibration compensation lens group.

20. The zooming optical system according to claim 18, wherein another lens group is arranged on an object side of said one of said plurality of lens groups.

* * * * *